United States Patent [19]

Fujimura et al.

[11] 3,881,193

[45] Apr. 29, 1975

[54] MULTI-CHANNEL MAGNETIC HEAD COMPRISING A PLURALITY OF SINGLE-TURN ELEMENTARY HEADS

[75] Inventors: Kenichi Fujimura, Neyagawa; Takashi Tanaka, Osaka, both of Japan

[73] Assignee: Matsushita Electric Industrial Co., Ltd., Osaka, Japan

[22] Filed: July 6, 1973

[21] Appl. No.: 377,137

Related U.S. Application Data

[63] Continuation of Ser. No. 195,414, Nov. 3, 1971, abandoned.

[30] Foreign Application Priority Data

| | | |
|---|---|---|
| Nov. 7, 1970 | Japan | 45-98583 |
| Nov. 16, 1970 | Japan | 45-01745 |
| Nov. 16, 1970 | Japan | 45-01746 |
| Nov. 17, 1970 | Japan | 45-01574 |
| Mar. 24, 1971 | Japan | 46-17420 |
| Nov. 10, 1970 | Japan | 45-11226[U] |

[52] U.S. Cl. .................. 360/123; 360/121

[51] Int. Cl. ...... G11b 5/20; G11b 5/27; G11b 5/28

[58] Field of Search .......... 179/100.2 C, 100.2 MD; 340/174.1 F; 346/74 MC; 360/121, 123

[56] References Cited

UNITED STATES PATENTS 3,737,991 6/1973 Fujimura et al. .......... 179/100.2 C

FOREIGN PATENTS OR APPLICATIONS 882,779 11/1961 United Kingdom .......... 340/174.1 F

*Primary Examiner*—Terrell W. Fears
*Assistant Examiner*—Robert S. Tupper
*Attorney, Agent, or Firm*—Wenderoth, Lind & Ponack

[57] ABSTRACT

A multi-channel magnetic head composed of a stack of a plurality of elementary head units, each unit comprising a ring type magnetic core having a magnetic gap therein, a conductive rod in the central opening of said magnetic core and two conductive plates one positioned on each side of said magnetic core and connected to said conductive rod and each of which is insulated from the conductive plate of the adjacent elementary head unit by a layer of insulating material.

10 Claims, 10 Drawing Figures

INVENTORS
KENICHI FUJIMURA
TAKASHI TANAKA

BY Wenderoth, Lind & Ponack
ATTORNEYS

INVENTORS
KENICHI FUJIMURA
TAKASHI TANAKA

BY Wenderoth, Lind & Ponack
ATTORNEYS

INVENTORS
KENICHI FUJIMURA
TAKASHI TANAKA

BY Wenderoth, Lind & Ponack
ATTORNEYS

MULTI-CHANNEL MAGNETIC HEAD COMPRISING A PLURALITY OF SINGLE-TURN ELEMENTARY HEADS

This invention relates to a multi-channel magnetic head, especially a head composed of a stack of a plurality of single-turn elementary heads.

A conventional multi-channel magnetic head is composed of a stack of a plurality of elementary head units with a suitable space between adjacent units, each unit comprising a ring type magnetic core made of two or three core members, a magnetic gap between two core members and a winding with a plurality of turns wound on said magnetic core.

In this construction, it is difficult to reduce the distance between two elementary head units because the windings occupy a large space. Moreover, windings with a plurality of turns make cores large and cause high cross-talk.

In addition, in the case of a head with magnetic oxide cores, air gaps between head tips and back cores with windings reduce output voltage and increase cross-talk, because the head tips are assembled into one stack in such a way that each of the head tips has a thin layer of glass sandwiched between two magnetic parts at a high temperature and a plurality of magnetic back cores with windings of a plurality of turns are joined with the head tips. Moreover, the elementary heads have output voltages different from each other because they have air gap lengths different from each other. The different output voltages have a serious effect especially on a multi-channel magnetic head with a small track width, because the small area between a back core and a corresponding head tip makes it difficult to reduce or to eliminate a difference in the output voltages.

An object of the present invention is to provide a multi-channel magnetic head which causes very little crosstalk between adjacent channels and has a high track density.

Another object of the present invention is to provide a multi-channel magnetic head in which the outputs of all elementary heads are nearly equal.

These objects are achieved by a multi-channel magnetic head according to the present invention which is composed of a stack of a plurality of elementary head units, each unit comprising a ring type magnetic core having a magnetic gap therein, a conductive rod in the central opening of said magnetic core and two conductive plates one positioned on each side of said magnetic core and connected to said conductive rod and each of which is insulated from the conductive plate of the adjacent elementary head unit by a layer of insulating material.

These and other features of the invention will be apparent from the following detailed description taken together with the accompanying drawings, in which.

Figure 1:
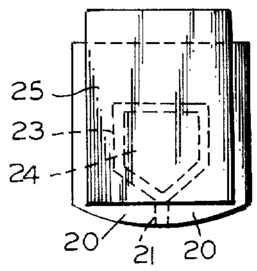
FIGS. 1 and 2 are front and side views showing a multi-channel magnetic head according to the present invention.
Figure 2:
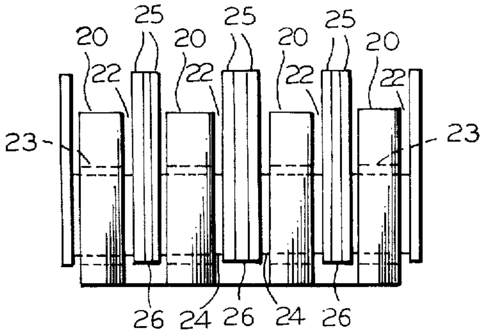

In FIG. 1 and FIG. 2, one embodiment according to the present invention is shown. A plurality of ring type magnetic cores 20 each having a magnetic gap 21 are stacked with suitable spaces 22 between them. In a central core opening 23 of each magnetic core 21, a conductive rod 24 is positioned. A conductive plate 25 is attached on both sides of each magnetic core 21 and connected to said conductive rod 24. The connection of said conductive plates to said conductive rod is made, for example, as follows. Said conductive plates are previously covered with a thin layer of solder and are soldered to said conductive rod by heating. Said two conductive plates and said conductive rod electrically connected to said two conductive plates compose a single-turn winding of an elementary head unit.

Two conductive plates 25 placed between each two adjacent magnetic cores 21 are insulated from each other by a layer of insulating material 26. Said conductive plates 25 and said conductive rod 24 are insulated from said magnetic cores 21 by layers of insulating material (not shown) formed on said conductive rod 24, when said magnetic cores 21 are made of magnetic materials with low electrical resistance such as Fe-Ni alloy. Using magnetic cores made of magnetic materials with relatively high resistance such as ferrites makes the head construction easy, because said lastmentioned insulation layers are not necessary. A winding with a plurality of turns necessarily must be insulated from the core on which the winding is wound even if the core is made of ferrite whose electrical resistivity is $10-10^5$cm, because the core resistance cannot be neglected when compared with the winding resistance. On the other hand, in the head according to the present invention the winding resistance is very small compared to the core resistance, because the winding has only one turn.

If necessary, a shield plate is placed between two conductive plates 25 on two adjacent magnetic cores 21. If the shield plate has a high electrical resistance such as plates of ferrites, the shield plate serves as said insulating layer 26.

Figure 3:
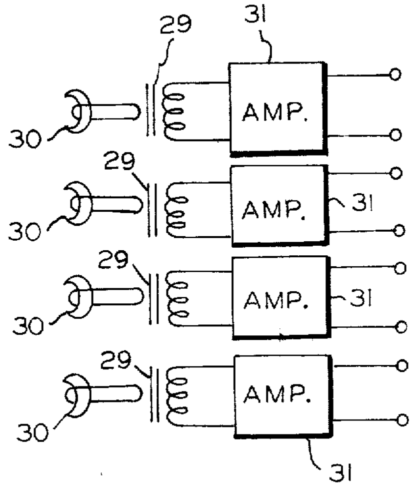
FIG. 3 is a diagrammatic representation of the connection of the magnetic head according to the present invention to the amplifiers.

Each of the elementary heads has a very small impedance and output, and requires very high recording current. So, usually a transformer 29 is connected between each of the elementary heads 30 and an amplifier 31 such as shown in FIG. 3 for matching the impedance and for transformations of voltage and current.

In this construction, each elementary head has a smaller size than the conventional heads. Therefore, cross-talk between adjacent channels is smaller.

The above-mentioned multi-channel magnetic head can have very small distances between adjacent elementary heads, because each of the elementary heads has a winding of only one turn composed of said conductive rod in the core opening and two conductive plates. Moreover, in the above-mentioned multichannel magnetic head, each elementary head has a high output compared with conventional heads and has nearly equal output to the other elementary heads, because none of the elementary head cores have joints between the head tip and the back core. The head construction without the joints reduces the cross-talk between adjacent elementary heads.

In this construction, as the conductive rod 24 and the conductive plates 25 occupy almost all the space of the central core opening 23 and the space 22 between adjacent cores, the single-turn windings have very low resistance. When a step-up transformer is used to step up the head voltage in the reproducing process, the lower limit of the frequency range is a frequency at which the inductive impedance of the primary winding of the transformer is nearly equal to the total resistance of the head and the transformer windings. The lower limit of the above-described multi-channel magnetic head is low because the winding resistance is low.

Figure 4:
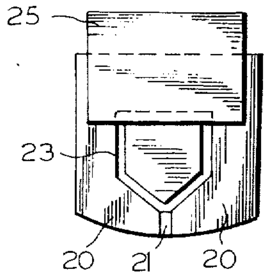
FIGS. 4 and 5 are front and side views showing another embodiment of the present invention.
Figure 5:
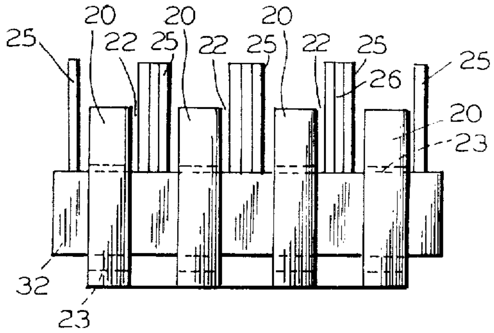
Figure 6:
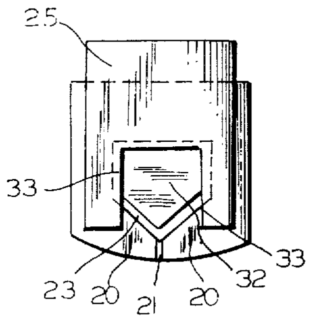
FIGS. 6 and 7 are front views of magnetic heads in which different conductive plates are used.
Figure 7:
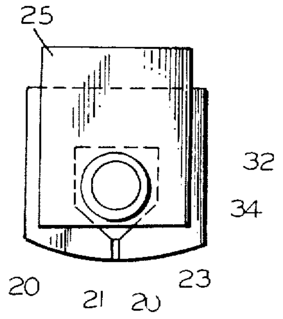

Another embodiment is shown in FIGS. 4 and 5, where said plurality of elementary head units have a single conductive rod 32 common to all the units. In this construction, each single-turn winding composed of said conductive rod and said conductive plates is connected to the single-turn windings of adjacent head units. But so long as said plates are insulated from plates in adjacent head units, there is no problem. On the other hand it is easy to construct the head. When each of said conductive plates 25 has a recess 33 in the lower side so that it sits astride said conductive rod 32 as shown in FIG. 6, or when each of said conductive plates 25 has a hole 34 through which said single conductive rod 32 extends such as shown in FIG. 7, the connection of said plates 25 and said rod 32 is easier and more complete.

Figure 8:
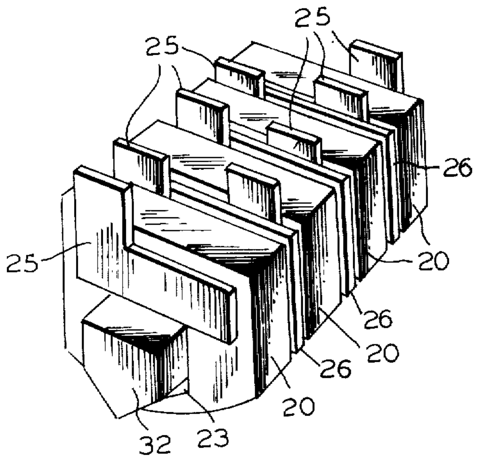
FIGS. 8 and 9 are perspective and plan views, respectively, showing another embodiment of the present invention.
Figure 9:
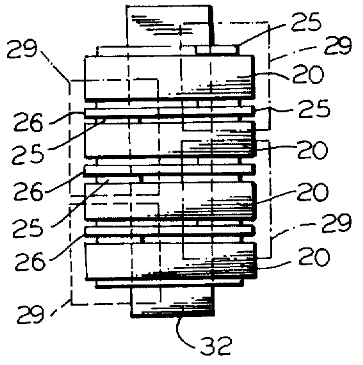

FIG. 8 shows another embodiment, in which said conductive plates 25 are L-shaped. This shape is useful for connection of external lead wires and for a staggered arrangement of transformers 29, such as shown in FIG. 9. In order to simplify the figure, said transformers 29 are shown by broken lines in the plan view (FIG. 9) of the multi-channel magnetic head shown in FIG. 8. With such an arrangement the multi-channel magnetic head according to the present invention can have high track density.

Figure 10:
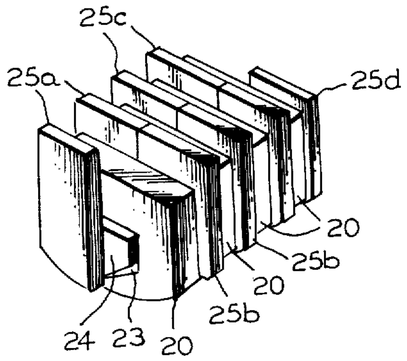
FIG. 10 is a perspective view showing a further embodiment of the present invention.

FIG. 10 shows another embodiment, in which said conductive plates are in pairs and each plate occupies substantially half of the space between adjacent magnetic cores 20, the pairs of plates forming parts of a winding being aligned alternatively on one side and then the other side along one surface of the head. Thus, pairs of plates 25*a*, 25*b*, 25*c* and 25*d* are provided in a staggered arrangement, and plates 25*a* and 25*b* each occupy a full slot, plates 25*b* and 25*c* occupy a full slot, etc. This construction is also useful for a staggered arrangement of transformers.

What we claim is:

1. A multi-channel magnetic head composed of a stack of a plurality of elementary single turn head units, each unit comprising an individual ring type magnetic core having a record medium engaging face having a magnetic gap therein, two side surfaces prependicular to said record medium engaging face, and a central opening therethrough extending between said side surfaces, the central openings of the cores in the stack being aligned to define a bore, a conductive rod extending through said bore, and two conductive plates, one positioned on each side of said magnetic core and each having a portion between opposing side surfaces of adjacent cores in the stock and being electrically connected to said conductive rod and extending out from between adjacent cores in a direction other than the direction that the magnetic gap lies from said conductive rod, a layer of insulating material between each two adjacent conductive plates in adjacent head units and insulating adjacent conductive plates in adjacent head units from each other, said adjacent conductive plates and intermediate insulating material separating said magnetic cores from each other, and transformer means coupled across the paid of conductive plates in each head unit.

2. A multi-channel magnetic head as claimed in claim 1 wherein said magnetic core is a magnetic material with high electrical resistance and is in direct contact with said conductive rod and said conductive plates.

3. A multi-channel magnetic head as claimed in claim 1 wherein said magnetic core is a magnetic material with high electrical resistance and is in direct contact with said conductive rod only.

4. A multi-channel magnetic head as claimed in claim 1 wherein said magnetic core is a magnetic material with high electrical resistance and is in direct contact with said conductive plate only.

5. A multi-channel magnetic head as claimed in claim 1 wherein said layer of insulating material is a magnetic material.

6. A multi-channel magnetic head as claimed in claim 1 wherein said conductive plates are L-shaped and have a leg extending out from between the magnetic cores in staggered relationship with the legs between other cores.

7. A multi-channel magnetic head as claimed in claim 1 wherein said conductive plates are in pairs, and each plate occupies substantially half of the space between adjacent magnetic cores, the pairs of plates forming parts of a winding being aligned alternatively on one side and then the other side along one surface of the head.

8. A multi-channel magnetic head as claimed in claim 1 wherein said plurality of elementary head units has a single conductive rod common to all the units.

9. A multi-channel magnetic head as claimed in claim 8 wherein each of said conductive plates has a recess in the lower side and sits astride said conductive rod with said rod in said recess.

10. A multi-channel magnetic head as claimed in claim 8 wherein each of said conductive plates has a hole therein through which said single conductive rod extends.

* * * * *